United States Patent
Garrison et al.

(10) Patent No.: US 7,490,063 B2
(45) Date of Patent: Feb. 10, 2009

(54) REMITTANCE PAYMENT PROCESSING WITH ACCOUNT SCHEMING AND/OR VALIDATION

(75) Inventors: David Lee Garrison, Columbus, OH (US); Patricia A. Kight, Dublin, OH (US); Brad Perkins, Dublin, OH (US); Cheryl Lynn Ward, Hilliard, OH (US); Mary Elizabeth Lawson, Dublin, OH (US); Amy Lynn Kerin, Delaware, OH (US)

(73) Assignee: CheckFree Corporation, Norcross, GA (US)

( * ) Notice: Subject to any disclaimer, the term of this patent is extended or adjusted under 35 U.S.C. 154(b) by 1202 days.

(21) Appl. No.: 10/043,247

(22) Filed: Jan. 14, 2002

(65) Prior Publication Data

US 2002/0111906 A1 Aug. 15, 2002

Related U.S. Application Data

(63) Continuation of application No. 08/994,047, filed on Dec. 19, 1997, now Pat. No. 7,296,004.

(51) Int. Cl.
*G06Q 40/00* (2006.01)
(52) U.S. Cl. ........................................ 705/40
(58) Field of Classification Search ............... 705/39, 705/40, 37, 38, 35, 7; 365/401; 235/380, 235/379
See application file for complete search history.

(56) References Cited

U.S. PATENT DOCUMENTS

| 4,774,664 A | 9/1988 | Campbell et al. |
| 4,908,850 A | 3/1990 | Masson et al. |
| 4,947,028 A | 8/1990 | Gorog |
| 5,153,907 A | 10/1992 | Pugh et al. |
| 5,197,094 A | 3/1993 | Tillery et al. |
| 5,208,593 A | 5/1993 | Tong et al. |
| 5,220,501 A | 6/1993 | Lawlor et al. ............... 364/408 |
| 5,222,018 A | 6/1993 | Sharpe et al. |
| 5,283,829 A | 2/1994 | Anderson .................... 380/24 |
| 5,298,731 A | 3/1994 | Ett |

(Continued)

FOREIGN PATENT DOCUMENTS

EP 0649105 4/1995

(Continued)

OTHER PUBLICATIONS

Article from PRNewswire, dated Dec. 10, 1997 and titled: "Remittance Payment Processing With Account Scheming and/or Validation", 5 pages.*

(Continued)

*Primary Examiner*—Mary Cheung
*Assistant Examiner*—Sanjeev Malhotra
(74) *Attorney, Agent, or Firm*—Sutherland Abill & Brennan LLP

(57) ABSTRACT

Systems and methods of remittance processing where a merchant database is provided that includes one or more alteration rules that are associated with a particular payee. A consumer account number associated with a payor is received and altered into a modified consumer account number, where the alteration is performed in accordance with one or more of the stored alteration rules. The modified consumer account number may then be transmitted to the particular payee to be utilized, for example, when processing a payment.

31 Claims, 6 Drawing Sheets

U.S. PATENT DOCUMENTS

| | | | |
|---|---|---|---|
| 5,325,290 A | 6/1994 | Cauffman et al. | 364/401 |
| 5,326,959 A | 7/1994 | Perazza | 235/379 |
| 5,336,870 A | 8/1994 | Hughes et al. | 235/379 |
| 5,383,113 A | 1/1995 | Kight et al. | 705/40 |
| 5,420,405 A | 5/1995 | Chasek | 235/379 |
| 5,432,326 A | 7/1995 | Noblett, Jr. et al. | |
| 5,465,206 A | 11/1995 | Hilt et al. | 364/406 |
| 5,504,677 A | 4/1996 | Pollin | 705/45 |
| 5,612,889 A | 3/1997 | Pintsov et al. | 364/478.14 |
| 5,649,114 A | 7/1997 | Deaton et al. | |
| 5,649,117 A | 7/1997 | Landry | |
| 5,677,955 A | 10/1997 | Doggett et al. | 705/76 |
| 5,699,528 A | 12/1997 | Hogan | 395/240 |
| 5,707,286 A | 1/1998 | Carlson | |
| 5,717,868 A | 2/1998 | James | 395/235 |
| 5,727,249 A | 3/1998 | Pollin | 705/40 |
| 5,740,549 A | 4/1998 | Reilly et al. | |
| 5,754,938 A | 5/1998 | Herz et al. | |
| 5,781,654 A | 7/1998 | Carney | 382/137 |
| 5,819,291 A | 10/1998 | Haimowitz et al. | |
| 5,826,165 A | 10/1998 | Echeita et al. | |
| 5,826,245 A | 10/1998 | Sandberg-Diment | |
| 5,835,087 A | 11/1998 | Herz et al. | |
| 5,873,072 A | 2/1999 | Kight et al. | |
| 5,880,446 A | 3/1999 | Mori et al. | |
| 5,909,670 A | 6/1999 | Trader et al. | |
| 5,915,243 A | 6/1999 | Smolen | |
| 5,920,847 A | 7/1999 | Kolling et al. | 705/40 |
| 5,920,848 A | 7/1999 | Schutzer et al. | 705/42 |
| 5,933,811 A | 8/1999 | Angles et al. | |
| 5,953,427 A | 9/1999 | Cordery et al. | 380/51 |
| 5,956,700 A | 9/1999 | Landry | |
| 5,966,698 A | 10/1999 | Pollin | 705/34 |
| 5,978,780 A | 11/1999 | Watson | |
| 6,021,202 A | 2/2000 | Anderson et al. | 380/25 |
| 6,026,385 A | 2/2000 | Harvey et al. | |
| 6,029,150 A | 2/2000 | Kravitz | |
| 6,035,285 A | 3/2000 | Schlect et al. | |
| 6,070,150 A | 5/2000 | Remington et al. | |
| 6,119,104 A | 9/2000 | Brumbelow et al. | |
| 6,119,106 A | 9/2000 | Mersky et al. | |
| 6,311,170 B1 * | 10/2001 | Embrey | 705/40 |
| 6,327,577 B1 * | 12/2001 | Garrison et al. | 705/40 |
| 6,438,527 B1 | 8/2002 | Powar | |

FOREIGN PATENT DOCUMENTS

| | | |
|---|---|---|
| EP | 782108 | 12/1996 |
| EP | 780807 | 6/1997 |
| GB | 2283588 | 5/1995 |
| JP | 63268086 | 4/1988 |
| JP | 2001-556 | 1/2001 |
| WO | 97/34243 | 9/1997 |
| WO | 99/56219 | 11/1999 |
| WO | 00/08612 | 2/2000 |

OTHER PUBLICATIONS

Check Fraud: Preventive Measures for Businesses, Jocelyn P. Taylor, Journal of Cash Management, v12n1, p. 34-38, Jan./Feb. 1992.

Dialog (R) File 636: Gale Group Newsletter DB (TM), 2001 The Gale Group, Item Processing Report, v5, n6, pN/A, Mar. 31, 1994.

Communications in Managing Modern Payment Systems, Management Accounting, London, Jul./Aug. 1997, vol. 75, Issue 7.

Dialog (R) File 636: Gale Group Newsletter DB (TM), 2001 The Gale Group, Credit Card News, v5, n26, pN/A, May 1, 1993.

Anonymous, "Industry Protests Curb US Routing Number Reforms," Cash Management News, Jul./Aug. 1994, n101, pp. 1-2.

Bruce Zagaris and Scott B. MacDonald, "Money Laundering, Financial Fraud, and Technology: The Perils of an Instantaneous Economy," The George Washington Journal of International Law and Economics, Washington: 1992, vol. 26m Iss. 1: pp. 1-32.

"11-digit Zip Code Causes Concern," Mar. 1993, Direct, p. 16.

Pavely, Richard W., "Automation brings changes to USPS,"Jan. 1993, Office, v117n1, p. 42.

"History of the U.S. Postal Service: 1775-1993, " Downloaded from Internet. <URL: www.usps.com/history/history/his3_5.htm> [retrieved on Jul. 30, 2002].

"1995 Software Guide: Conveying the message faster, more efficiently," Direct Marketing [Downloaded from Proquest]. vol. 58, No. 2, Jun. 1995, p. 46-[printed pp. 1-10].

"Postalsoft Inc., Delivers Address-Correction Tool," American Banker [Downloaded from Proquest]. vol. 159, No. 88, May 9, 1994, p. 16A-[printed pp. 1-2].

Notess, Greg et al., "On The Nets: Internet Ready Reference Resources," [Downloaded from Proquest]. vol. 19, No. 2, Apr./May 1996, pp. 88-91.

Rose, Matthew; Castellano, Brenda; Di Bella, Lori; Direct Marketing software guide. (Guide for software packages for marketing) Jun. 1989, direct Marketing, vv52, n2, p. 53(23).

"SSN Verifier Another Step Toward Stemming Fraud," Item Processing Report, The Gale Group, v5, n6, Mar. 31, 1994.

"The Card Industry Cools Its Heels Waiting For a Fraud-Busting Code," Credit Card News, The Gale Group, v5, n26, May 1, 1993.

Declaration of Mary Elizabeth Lawson (3 pages).

Disclosure Under 37 C.F.R. 1.56 (4 pages).

* cited by examiner

REMITTANCE PAYMENT PROCESSING WITH ACCOUNT SCHEMING AND/OR VALIDATION

CROSS-REFERENCE TO RELATED APPLICATIONS

The present application is a continuation of, and claims the benefit of priority from, U.S. patent application Ser. No. 08/994,047 (now U.S. Pat. No. 7,296,004), entitled ELECTRONIC BILL PAYMENT SYSTEM WITH MERCHANT IDENTIFICATION filed on Dec. 19, 1997. The entire contents of the above-recited priority document are hereby incorporated by reference as if set forth fully herein. Additionally, the present application is related to U.S. patent application Ser. No. 08/994,046 (now U.S. Pat. No. 6,327,577), filed on Dec. 19, 1997, entitled AN ELECTRONIC BILL PAYMENT SYSTEM WITH ACCOUNT NUMBER SCHEMING, and U.S. patent application Ser. No. 08/994,363 filed on Dec. 19, 1997, entitled AN ELECTRONIC BILL PAYMENT SYSTEM WITH ACCOUNT RANGING, which were both filed simultaneously with U.S. patent application Ser. No. 08/994,047. The present application is also related to U.S. patent application Ser. No. 09/010,193 filed on Jan. 21, 1998, entitled DUAL SOURCE REMITTANCE PROCESSING; U.S. patent application Ser. No. 10/443,864 filed on May 23, 2003, entitled PAYMENT REMITTANCE PROCESSING WHEN ACCOUNT SCHEMING FAILS; and U.S. patent application Ser. No. 10/443,865 filed on May 23, 2003, entitled PAYMENT REMITTANCE PROCESSING WHEN REMITTANCE CENTER IDENTIFICATION FAILS.

TECHNICAL FIELD

The present invention relates to electronic commerce. More particularly, the present invention relates to an electronic bill payment system with merchant identification.

BACKGROUND ART

It has been common for many years for consumers to pay bills by way of a personal check written by the consumer to the order of an entity and delivered to that entity by mail or in person. With the proliferation of computers interconnected to computer networks, particularly the Internet, consumers can now pay bills electronically. However until recently it was not possible for a consumer, using a computer terminal, to interact with a single payment system capable of paying all the consumer's bills whether by electronic means or by a paper check. Such a system now exists in the form of a consolidated bill payment system as described by Kight, et al. in U.S. Pat. No. 5,383,113, entitled SYSTEM AND METHOD FOR ELECTRONICALLY PROVIDING CUSTOMER SERVICES INCLUDING PAYMENT OF BILLS, FINANCIAL ANALYSIS AND LOANS.

Although the consolidated bill payment system described by Kight, et al. significantly advanced the state of the art, it did not focus on several problems which may arise in implementing a consolidated bill payment system capable of automatically paying consumer bills to merchants. One such problem is that consumers or data entry personal sometimes make mistakes in entering payment data required by the bill payment system.

Such a case arises when a consumer's account number with a merchant is incorrectly entered. The payment system must submit a correct account number to the merchant who will use this account number to associate the payment with the consumer. Thus, a technique is needed to validate the submitted consumer's account number.

A data entry person may also enter payment data which incorrectly specifies the merchant's name or parts of the merchant's address. It has been found that merchant information such as the merchant name, address, zip code are typically mangled at the data entry stage. It has been further observed that errors will often be made upon entry of the zip code. The merchant's name, address, and zip code is typically required by the payment system in order to, for example, retrieve merchant records from the merchant database. If this data is incorrect, the payment system may be unable to retrieve the correct merchant's record for processing a payment. Thus, a technique is needed to correctly identify a merchant record notwithstanding the submission of erroneous merchant data.

A consolidated bill payment system must also have the capability to properly remit payments to the same merchant at more than one remittance center. Commonly a large commercial merchant,(e.g., shoe company, Sears) will have several remittance centers distributed geographically so that customers can submit bills to a center within their location. Thus, a technique is required to ensure that consumer payments are remitted to the proper one of multiple remittance centers associated with the same.

Advantageously, a consolidated payment system must also be able to handle the different processing formats and requirements of numerous separate merchant accounting systems. For example, each merchant's account system may require payment information, such as consumer account numbers, in a format different than that submitted by the consumer. For example, many merchant accounting systems will only accept an account number with some portion of a consumer's last name or the consumer's zip code appended to the end of the account number presented by the customer.

A merchant account system may even require an altered consumer account number which uniquely identifies the consumer. For example, two consumers, e.g., spouses, may have identical account numbers, but the merchant accounting system may designate the account of each consumer uniquely, such as by combining the account number with the prospective customer's name. Additionally, it is not unusual for a merchant to have different account numbers for a single customer. For example, an account number on an invoice which goes out electronically may be different from an account number for the same customer which goes out as a paper transaction.

Thus, a consolidated bill payment system must be able to handle the various formats required by the merchant accounting system of each merchant. Accordingly, a technique is required to transform payment data received from the consumer into a form compatible with a merchant's accounting system.

SUMMARY DISCLOSURE OF THE INVENTION

In accordance with the present invention, a communications network couples a payer station, working on behalf of a consumer or corporate user, and a payee, typically a merchant, to a programmed computer, or possibly a distributed system of computers, which processes payment requests, allowing them to communicate and exchange data between themselves. The communications network may be of any type facilitating the flow of information among the entities, such as a private network or the Internet. To process payment requests, a first station, e.g. a payer station, transmits payment information, including name, address data, and a payor's account number with one of perhaps thousands of payees and a second station, e.g. a payment processing server, receives this payment information and account number over the network. The payer station initiates payment on behalf of consumers or corporate users. The second station then processes the payment information to produce an eleven digit zip code for the payee, and access a database of payees, typically merchants, to locate a payee record corresponding to the eleven digit zip code. In a further aspect of the present invention, the second station transforms the payer account number into an altered payer account number according to alteration rules. In a further aspect of the present invention, the payee has more than one remittance center and the second station is further configured to process an account number to identify a single remittance center in which to direct a payment which includes the altered payer account number.

The first station collects payment requests from a plurality of consumers and feeds the requests to the second station. Typically, the second station is realized as a programmed general computer having a storage device and a processor. The storage device is configured to store a database of payee records and also includes alteration rules and validation rules for each payee. As will be understood by those skilled in the art, the storage device may be configured in any one of many arrangements to store and manage databases, and could include a long term bulk storage configuration, such as one or more hard disks.

The alteration rules can specify a wide variety of formats and may be realized as templates specifying fields or values, or as instructions for combining information from different fields. Typically, an altered account number is formed by combining the account number with some part of payment information or other information related to the payee. For example, the altered account number may include a portion of the payor's name, a portion of the payor's address, or a portion of the payor's zip code combined with the account number.

According to another aspect of the present invention, validation rules for the account number are stored, and a determination is made as to whether the received account number conforms with the validation rules. The validation rules identify the expected general format for any payer account number associated with a payee. Validation rules are preferably realized as templates specifying fields or values, but may take on other forms, and may even be algorithms. For example, a check digit algorithm could process the account number and compare the result to a check digit.

Preferably, the general computer of the second station is a mainframe or mini computer or high powered workstation, but could be any other processing device capable of executing programmed instructions. Additionally, the general computer could be a distributed computer system in which various aspects of the system run on different platforms. The processor of the general computer is programmed to receive payment information, process the payment information, excluding zip code information, to produce an eleven digit zip code for the payee, access the database to locate a payee record corresponding to the eleven digit zip code, and then, preferably, makes an electronic payment to the payee after locating the payee record. The processor determines the eleven digit zip code preferably based on payee's name, and address, or some part thereof. However, the eleven digit zip code may also be determined based on other possible combinations of parts of the payment information, e.g. a portion of the payee's address.

In a further aspect of the present invention, the processor verifies the account number conforms to the validation rules, and transforms the verified account number into an altered account number according to the alteration rules.

In a further aspect of the present invention, the payee has a plurality of remittance centers, and the processor further processes the verified account number to identify a single remittance center of the plurality of remittance centers to which payment should be remitted.

The processor's programmed instructions can be stored on a storage medium. This article of manufacture may be portable, a floppy disk, a hard disk, a CD Rom, or other storage medium. The processor reads the programmed instructions from the medium and in accordance therewith receives payment information including a payor's account number, processes the payment information, excluding zip code information, to produce an eleven digit zip code for the payee, and preferably accesses the database to locate a payee record corresponding to the eleven digit zip code, and then, preferably, makes an electronic payment to the payee after locating the payee record. In another aspect of the present invention, the processor may also verify the account number based upon validation rules for account numbers associated with one of a plurality of payees, and preferably transform the account number into an altered account number based upon alteration rules of the one payee, and transmit the altered account number to the payee.

BEST MODE FOR CARRYING OUT THE INVENTION

Figure 1:
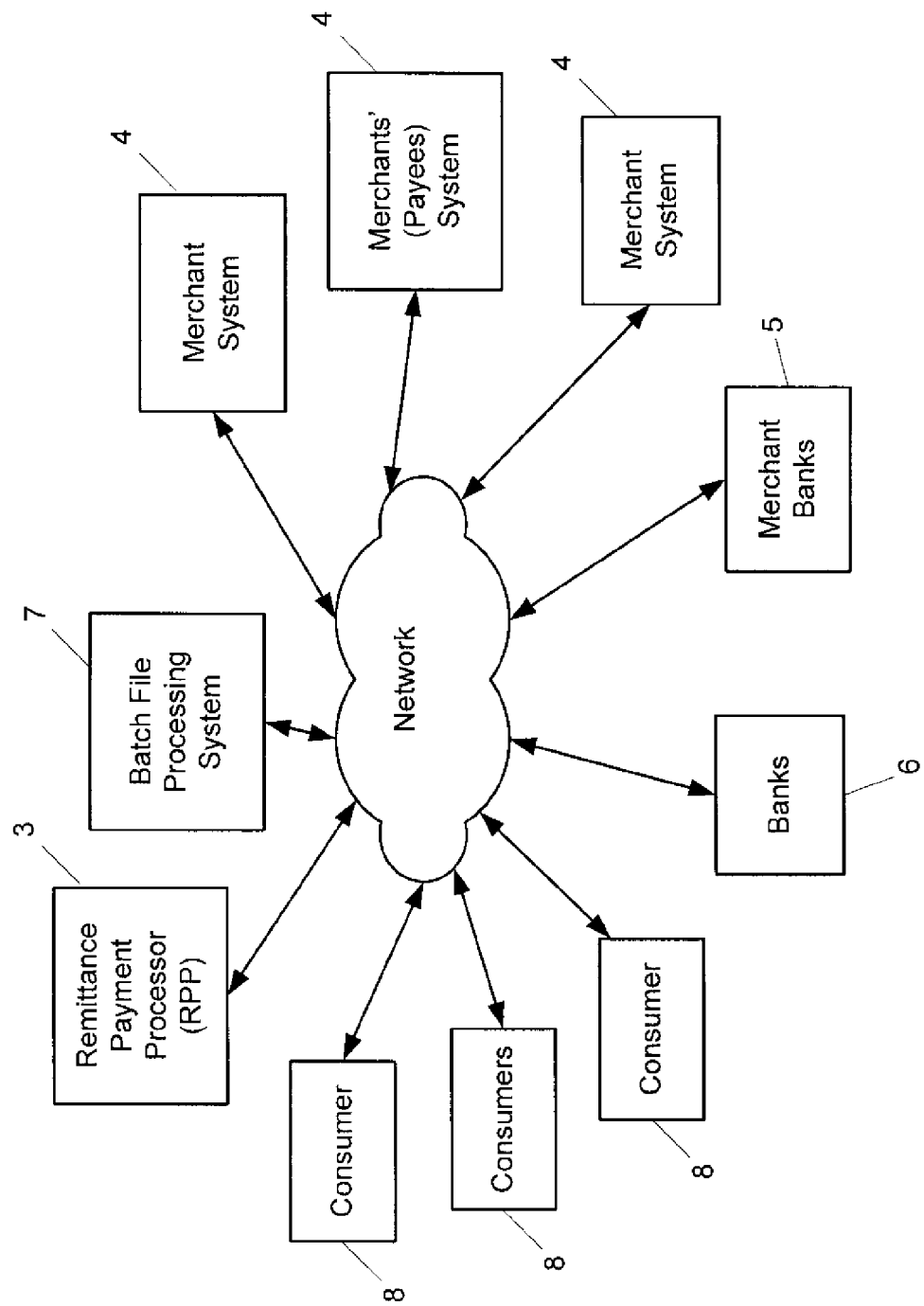
FIG. 1 is a system overview of a computerized bill payment system in accordance with the present invention.

FIG. 1 generally depicts a bill payment system including consumers 8, merchants 4, a batch file processing system 7, a remittance payment processor (RPP) 3, merchant banks 5, and consumer banks 6.

A consumer, including a corporate user, (payer) is the individual or other entity for whom payments are actually made and whose account will be debited by the amount of the payment. The consumers 8 typically submit their payments electronically to batch file processing system 7. The batch file processing system 7 represents any computer or network of computers capable of collecting payment requests from the consumers 8.

Consumer banks 6 either physically or electronically holds money on account for consumers 8. These accounts are debited by the amount of any payments made on behalf of the consumers 8.

Merchants (payees) 4 are the persons or other entities to whom payments are made via the bill payment system on behalf of consumers. Merchants may include department stores, the phone company, the paper boy, a credit card company, as well as other persons and entities to whom payments are made by one or more consumers 8. Merchants have accounts with merchant banks 5.

Figure 2:
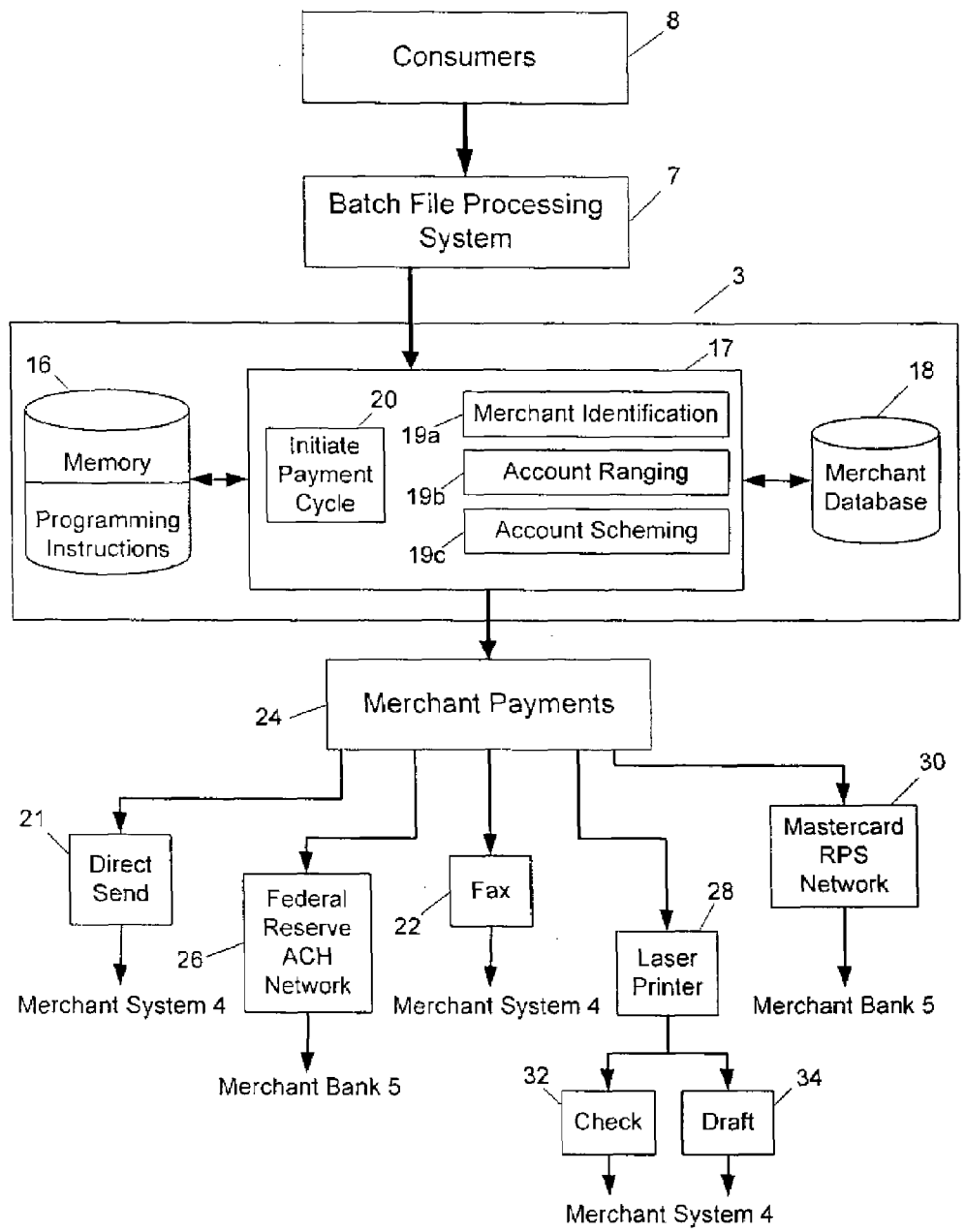
FIG. 2 is a diagrammatical representation of the remittance payment processor system of FIG. 1.

The remittance payment processor (RPP) 3, as shown in FIG. 2, includes a memory 16 storing programmed instructions for carrying out the functions of the RPP, a processor 17 for executing these instructions, and a merchant database 18 storing information associated with the merchants. A batch file processing system 7 provides payment records collected from consumers 8 and transmits the batches of records to the RPP 3.

A network 1 connects the above-stated entities making communications between them possible. The network may be of any type capable of facilitating the flow of information among the various entities. It could, for example, be a public telecommunication network, the Internet, or other type of communication network. The network 1 may also be physically realized as one or more networks. For example, in one possible embodiment, consumers 8 are coupled to batch file processing system 7 through one network and the batch file processing system is coupled to the remittance payment processor (RPP) through another separate network.

In operation, consumers 8 make payment requests electronically and these payment requests are collected by the batch file processing system 7. The batch file processing system 7 then transfers the payment requests collected from consumers 8 to the RPP 3 via the network 1. Payment information for a consumer will include several different types of information, such as the consumer account number, the merchant name, and address.

FIG. 2 illustrates an overview of the process flow within the bill payment system of RPP 3. RPP 3 receives payment information from the batch file processing system 7, processes that payment information, and passes the processed information to a component 24 which then makes payments to merchants 4. A payment is implemented by crediting a merchant's account electronically with a bank or other financial institution, or transferring a check or draft to the merchant. A payment implementation also includes sending advice to the merchant. Advice is information on a bill payment presented to a merchant electronically in a form that the merchant's system can use to process the bill payment transaction and update the merchant's records. One possible mode of payment to a merchant is electronic funds transfer through the Federal Reserve Automated Clearing House (ACH) Network 26. Another electronic payment avenue is through the MasterCard RPS Network 30. Another remittance advice delivery mode is through Fax 22. Additionally, payment can also be made non-electronically to a merchant causing laser printer 28 to print a check 32 or a draft 34. There is also a direct send 21 capability whereby the payment system sends advice to a merchant 4.

RPP 3 stores or processes several different record types necessary to the bill payment process. A merchant record contains all necessary information needed to forward a payment. This includes a merchant name, address, and zip code. A consumer record include a consumer name, address, zip code, and consumer account number. A payment record will contain information related to payment, including payee identification, consumer identification, and the dollar amount of the transaction. The merchant records are stored in a merchant database 18. All other records as well as programmed instructions which direct the operation of the RPP are stored in a memory 16. The memory 16 could also store the merchant database 18 if desired.

After receiving payment records from the batch file processing system 7, the RPP periodically initiates a payment cycle 20 which process the records to generate information which will be used to credit merchant accounts and form advice for merchant systems. The processing flow of the billing cycle contains, in addition to other processes, three particularly important processes necessary for successful processing of each payment record. These processes are merchant identification 19a, account ranging 19b, and account scheming 19c, typically performed in this order. In the first step of processing a payment record, merchant identification attempts to identify a merchant in the merchant database 18 based on information in the payment record. In the second step, the system will attempt to determine a remittance center of the merchant to which the billing information is sent. If a candidate remittance center is identified, the system enters the third stage of processing, account scheming. In account scheming, the system attempts to normalize a user account with a merchant according to the merchant's rules. If account scheming fails, the system will return to the account ranging process to attempt to identify another candidate remittance center, and from there, again into account scheming.

Although the above described payment cycle is a preferable embodiment of the RPP, a payment cycle can include the three processes of merchant identification 19a, account ranging 19b, and 19c, in any order or combination. In addition, these three processes may be performed independently, and could also be performed and packaged individually outside the RPP. These three processes will now be described in further detailed herein referring to FIGS. 3-6.

Figure 3:
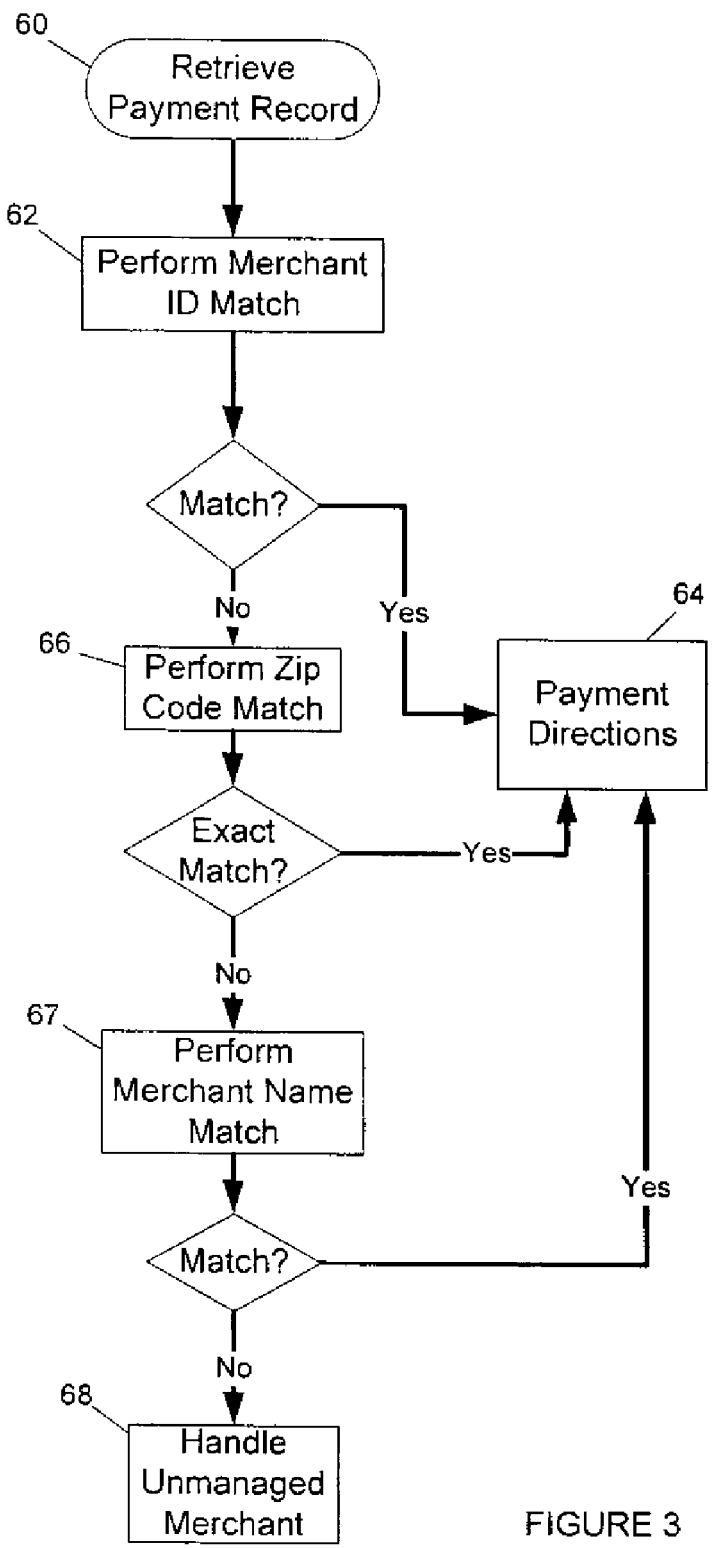
FIG. 3 is a flow chart illustrating merchant identification in accordance with the present invention.

FIG. 3 illustrates merchant identification. Using merchant identification, the RPP 3 is able to retrieve the correct merchant record from merchant database 18 based on a consumer's payment record submitted with possibly erroneous merchant name and address information, e.g., street address, city, state, zip code. It has been observed that data entry operators will often make errors in the merchant's street address and zip code. The RPP 3 is capable of mapping the mangled merchant information supplied in the payment record into the proper merchant record in the merchant database 18 notwithstanding the errors in the merchant information. Merchant identification as described herein, can be used in any implementation where merchant information is likely to contain errors and must be mapped into an existing merchant record in the merchant database.

RPP 3 initiates merchant identification by step 60 which retrieves a payment record from one of the payment records previously submitted by the batch file processing system 7. The RPP will first attempt to retrieve a merchant record from the merchant database 18 by matching the merchant id included in the payment record against the records of the merchant database 18. If this is successful, the processing of the payment record can continue to the payment directions stage 64. The payment directions stage is where the RPP determines where to send payments. This stage includes account ranging discussed below which determines the remittance center to which payment gets sent. If there is no match, the RPP continues to step 66. At step 66, the RPP maps the merchant's merchant name and address, excluding the provided street address and zip code, into an eleven digit zip code. That is, the RPP produces an eleven digit zip code based on merchant name, city, and state in the payment information. In order to avail the merchant information which the inventors have determined to be mostly likely to contain errors, the received merchant street address and zip code are not considered. Hence, in step 66 the RPP 3 identifies an eleven digit zip code based only on the merchant's name, city, and state.

Figure 4:
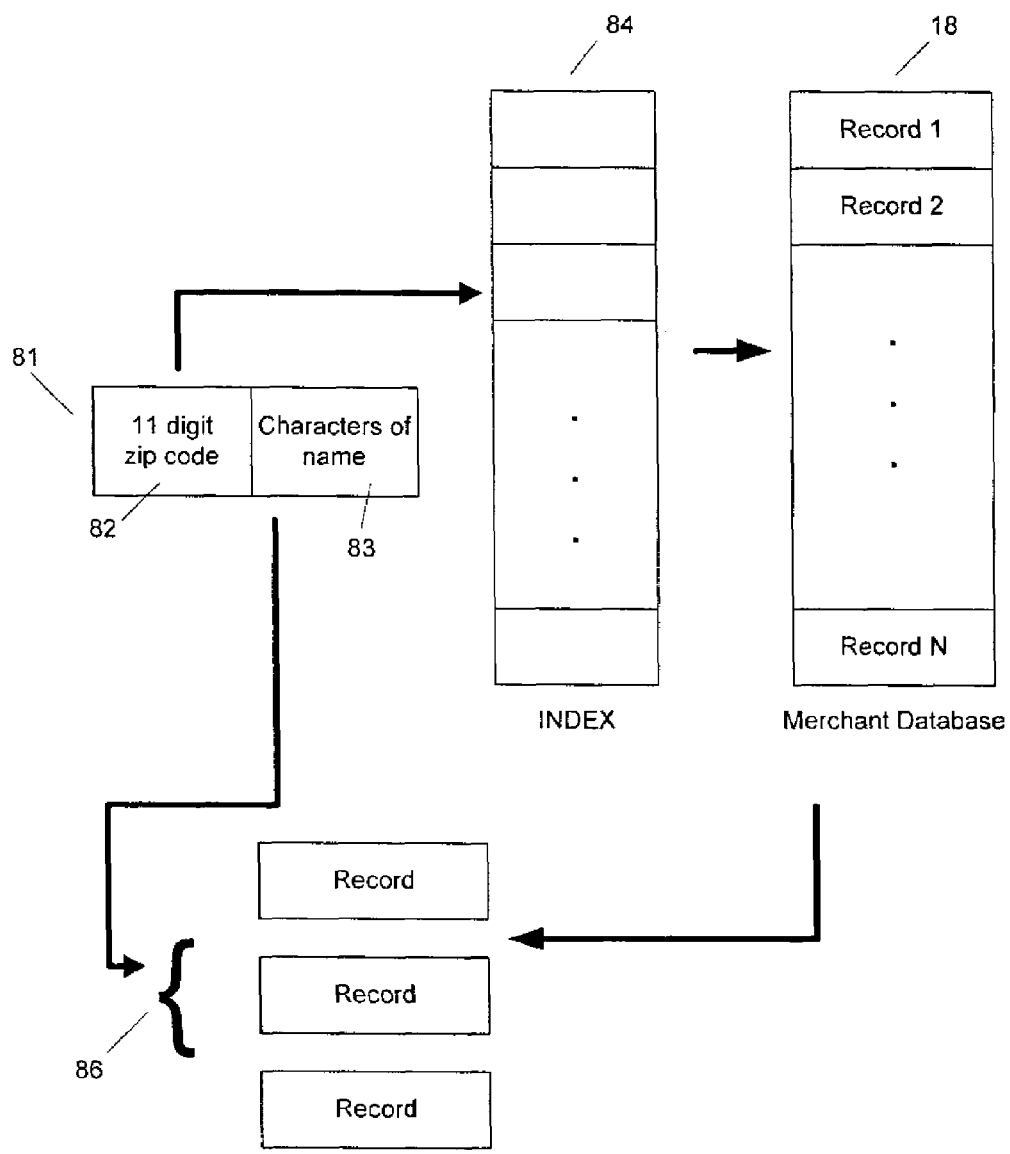
FIG. 4 is a block diagram illustrating how merchant identification accesses the merchant database.

Step 66 of merchant identification uses the indexing structure shown in FIG. 4 to access one or more records from the merchant database 18.

In step 66, the RPP 3 forms a 11 digit zip code index 82 to associating, the index entry with a merchant record in merchant database 18 via index 84. It may be possible that there is more than one merchant at a location identified by an eleven digit zip code. For example, there could be a remittance processing center on the floor of the building identified by the eleven digit zip code which handles payments for several merchants 4. In such a case, the RPP differentiates the correct merchant record from other possibly correct merchant records associated with the same eleven digit zip code by, after identifying merchant records indexed to the same eleven digit zip code, comparing some portion of the merchant's name, e.g., the first five characters with the characters of each merchant's name which has been combined with the application zip code in the merchant index. The RPP 3 is thereby able to uniquely identify the proper merchant record.

If step 66 identifies a unique merchant record processing continues to step 64. However, if step 66 retrieves more than one merchant forming a group of records 86, then at step 67 the RPP 3 will attempt to match one or more characters of the merchant's name 83 against the records 86 to identify a merchant record. If a match is found, processing continues to the payment directions stage 64. If there is no match, then the RPP will handle this contingency at step 68. If there is no merchant, the system may have provisions at step 68 for adding the merchant to the merchant database 18.

Figure 5:
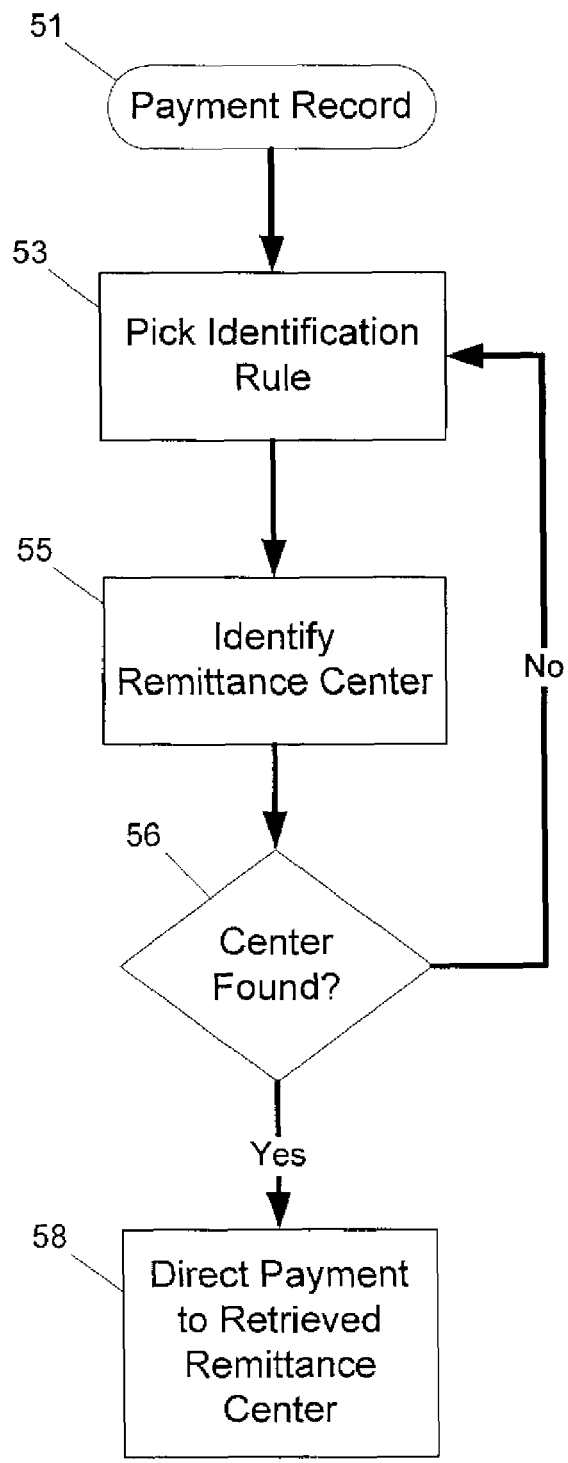
FIG. 5 is a flow chart illustrating account ranging in accordance with the present invention.

FIG. 5 illustrates a payment direction stage, as performed in the preferred embodiment of the present invention, in which the RPP attempts to determine a remittance center to which payment is sent. The RPP determines a remittance center based on one or more of the following identification rules: 1) length of account number, 2) merchant zip code, 3) merchant name, and 4) account ranging. Each rule has in common that it identifies the remittance center based on some factor of the payment information.

In FIG. 5, the RPP 3 processes the payment record presented in step 51 to determine one of a plurality of remittance centers associated with the applicable merchant in which to make payment. In step 53, the RPP chooses one of the above-mentioned four rules and at step 55 attempts to identify a remittance center. If a remittance center is found at step 56, then the RPP directs payment to that remittance center 58. If the RPP is unsuccessful in determining a remittance center, the RPP cycles back to step 53 and picks a new rule for identification. By this process, the system cycles through all combinations of rules that identify remittance centers for the merchant.

In account ranging, the correct remittance center is determined based on some characteristic of the consumer's account number. Typically a large merchant, such as credit card company will have multiple remittance centers to which respective consumer payments must be submitted. The payment record contains information which may be used to identify a remittance center besides an account number, such as an area code of the payor's telephone number. A telephone phone utility might include each consumer's area code in the consumer's account number and require payments from all consumers within a particular area code be directed to a particular one of multiple remittance centers. A credit card company may require that payments from all consumers having the same first six digits in their account numbers be made to the same remittance center.

The payment direction process illustrated in FIG. 5 is a preferred embodiment for determining payment direction. In this embodiment, the payment direction process includes account ranging as one of four possible methods of identifying a remittance center. However, in other embodiments, account ranging may be used in different combinations, or independently.

Figure 6:
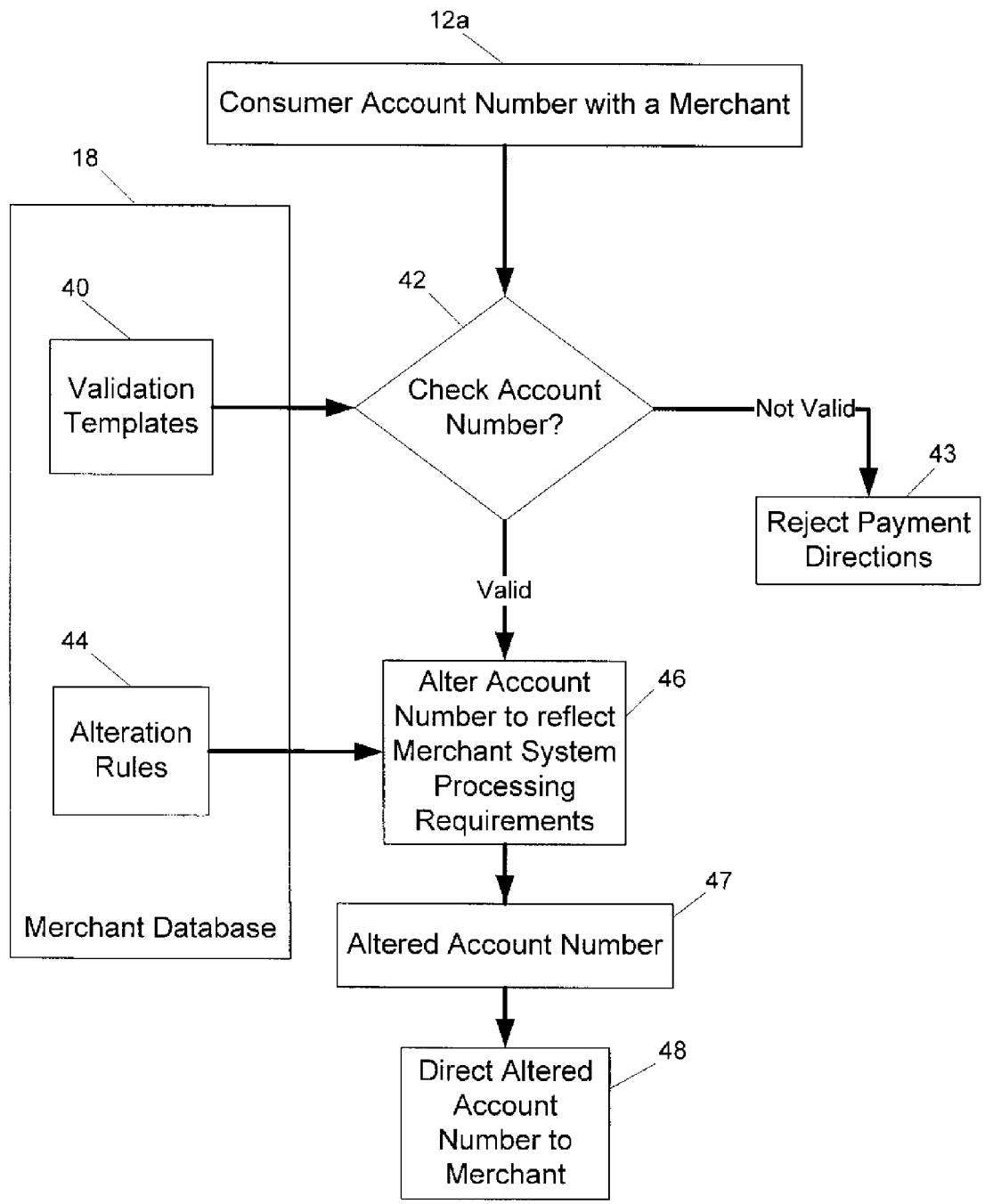
FIG. 6 is a flow chart illustrating account scheming in accordance with the present invention.

FIG. 6 illustrates the steps for account scheming. In certain cases, the consumer account number received by the RPP as part of the payment information may contain errors. Hence, the RPP has no way of checking the account number against a previously stored account number associated with the applicable consumer to verify the accuracy of the received information.

Using account scheming, the RPP receives, in step 12a, the consumer account number as part of the payment record. In step 42, the RPP checks to validate the account number. Then in step 46, the RPP alters the account number to correspond to a format required by a merchant's system 4 for processing.

More particularly, the RPP validates and alters the consumer account number by storing separate business rules for each merchant which identify the expected general format for any consumer account number associated with that merchant. These business rules are stored as validation templates 40 in merchant database 18 for each merchant. The account number received from the consumer is checked against the validation template to validate that the account number conforms to the general account number format to which an account number associated with the applicable merchant must conform. For example, the validation template for a merchant such as a credit card company may require an account number begin with the numbers "43" and be 18 digits long. Additionally, for some merchants the validation template will have check digit requirements. That is, the validation template can be used to confirm that the received consumer account number conforms to a check digit after being run through a specific algorithm.

In operation, the RPP 3 performs, in accordance with programmed instructions stored on the memory 16, the validation procedure by comparing in step 42 the received consumer account number for the applicable merchant received in step 12a with the validation template, say 40, for that merchant to test the validity of the account number. If that account number is not valid, the payment directions are rejected as not valid in step 43; otherwise, the account number is considered valid.

Once the account number has been validated, it is then modified in step 46 so as to conform to alteration rules 44 for the applicable merchant. The alteration rules 44 are also stored in database 18. The alteration rules 44 relate to the format of the consumer's account number in which the applicable merchant system requires to process a consumer's payment. Typically, alteration rules would specify an altered account number which includes a portion of a payor's name with the account number, a portion of the payor's address with the account number, or a portion of the payor's zip code with the account number. Alteration by the RPP 3 involves notifying the received account number which will be furnished, along with payment, to the merchant. For instance, some merchant systems require that the consumer's account number always end in "120". Hence, in such a case, the RPP 3, in accordance with programmed instructions stored on the memory 16, modifies the received account number to append "120" to the end of the alpha-numeric sequence of the received account number. Once the account number has been modified so as to conform to the format required by the merchant system, the altered account number 47 is then transmitted from the RPP 3 to the merchant 4 via the network 1, along with the payment, in step 48.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, e.g. a bill payment system, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

The invention claimed is:

1. A computer-implemented method comprising:
   receiving a consumer account number associated with a payor and a payee, wherein the consumer account number is not in a format acceptable to the payee;
   selecting at least one alteration rule associated with the payee, wherein the at least one alteration rule is associated with at least one account number format that is acceptable to the payee;
   altering the consumer account number to a modified consumer account number based on the at least one alteration rule associated with the payee, and wherein altering the consumer account number to a modified consumer account number includes inserting a character string at a particular position in the consumer account number to create the modified consumer account number; and
   transmitting the modified consumer account number to the payee.

2. The method of claim 1, wherein transmitting the modified consumer account number to the payee includes transmitting payment information to the payee.

3. The method of claim 1, wherein the at least one alteration rule identifies an expected account number format required by the payee.

4. The method of claim 1, wherein the at least one alteration rule is associated with a plurality of payees.

5. The method of claim 1, wherein the consumer account number is received as part of a payment record.

6. The method of claim 5, wherein the payment record is one of a plurality of payment records received in a batch.

7. The method of claim 1, wherein the character string is comprised of numeric characters, non-numeric characters, or a combination of numeric characters and non-numeric characters.

8. The method of claim 1, wherein the character string includes a portion of the payor's name, a portion of the payor's address, a portion of the payor's zip code, or a payee-defined character string.

9. The method of claim 1, further comprising:
   receiving payee information in conjunction with the consumer account number, wherein the payee information identifies the payee;
   generating an eleven-digit zip code associated with the payee information; and
   prior to altering the consumer account number, locating the payee on a merchant database using the eleven-digit zip code.

10. The method of claim 1, further comprising, prior to altering the consumer account number, validating the consumer account number.

11. The method of claim 10, wherein validating the account number includes verifying that (i) the consumer account number is of a specific length, (ii) the consumer account number includes a specific character string, (iii) the consumer account number includes a specific character string at a particular position within the consumer account number, or (iv) the consumer account number yields a particular check digit after being run through a specific algorithm.

12. The method of claim 10, wherein validating the account number includes comparing the consumer account number with at least one validation template, wherein the validation template is one of a plurality of validation templates stored in association with a plurality of payees on the merchant database.

13. The method of claim 12, wherein the alteration rule is associated with the validation template.

14. The method of claim 1, wherein receiving a consumer account number associated with a payor and a payee includes receiving the consumer account number in a format that is not compatible with an accounting system of the payee.

15. The method of claim 1, wherein selecting at least one alteration rule associated with the payee includes selecting at least one alteration rule associated with at least one account number format that is compatible with an accounting system of the payee.

16. A system comprising:
   a merchant database, wherein the merchant database includes at least one alteration rule stored in association with a payee; and
   a processor, in communication with the merchant database, wherein the processor executes software instructions for:
     receiving a consumer account number associated with a payor and the payee, wherein the consumer account number is not in a format acceptable to the payee,
     selecting the at least one alteration rule associated with the payee, wherein the at least one alteration rule is associated with at least one account number format that is acceptable to the payee,
     altering the consumer account number to a modified consumer account number; based on the at least one alteration rule associated with the payee, and wherein altering the consumer account number to a modified consumer account number includes inserting a character string at a particular position in the consumer account number to create the modified consumer account number, and
     transmitting the modified consumer account number to the payee.

17. The system of claim 16, wherein the software instructions for transmitting the modified consumer account number to the payee include transmitting payment information to the payee.

18. The system of claim 16, wherein the at least one account number alteration rule identifies an expected account number format required by the payee.

19. The system of claim 16, wherein the at least one account number alteration rule is associated with a plurality of payees.

20. The system of claim 16, wherein the software instructions for receiving a consumer account number associated with a payor include receiving the consumer account number as part of a payment record.

21. The system of claim 20, wherein the payment record is one of a plurality of payment records received in a batch.

22. The system of claim 16, wherein the character string is comprised of numeric characters, non-numeric characters, or a combination of numeric characters and non-numeric characters.

23. The system of claim 16, wherein the character string includes a portion of the payor's name, a portion of the payor's address, a portion of the payor's zip code, or a payee-defined character string.

24. The system of claim 16, wherein the processor is configured to execute additional software instructions for:
receiving payee information in conjunction with the consumer account number, wherein the payee information identifies the payee,
generating an eleven-digit zip code associated with the payee information, and
prior to altering the consumer account number, locating the payee on the merchant database using the eleven-digit zip code.

25. The system of claim 16, wherein the processor is configured to execute additional software instructions for:
prior to altering the consumer account number, validating the consumer account number.

26. The system of claim 25, wherein the software instructions for validating the account number include verifying that (i) the consumer account number is of a specific length, (ii) the consumer account number includes a specific character string, (iii) the consumer account number includes a specific character string at a particular position within the consumer account number, or (iv) the consumer account number yields a particular check digit after being run through a specific algorithm.

27. The system of claim 25, wherein the software instructions for validating the account number include comparing the consumer account number with at least one validation template, wherein the validation template is one of a plurality of validation templates stored in association with a plurality of payees on the merchant database.

28. The system of claim 27, wherein the alteration rule is associated with the validation template.

29. The system of claim 16, wherein the consumer account number is received in a format that is not compatible with an accounting system of the payee.

30. The system of claim 16, wherein the at least one alteration rule is associated with at least one account number format that is compatible with an accounting system of the payee.

31. A system comprising:
means for receiving a consumer account number associated with a payor and a payee, wherein the consumer account number is not in a format acceptable to the payee;
means for selecting at least one alteration rule associated with the payee, wherein the at least one alteration rule is associated with at least one account number format that is acceptable to the payee;
means for altering the consumer account number to a modified consumer account number based on the at least one alteration rule associated with the payee, and wherein altering the consumer account number to a modified consumer account number includes inserting a character string at a particular position in the consumer account number to create the modified consumer account number; and
means for transmitting the modified consumer account number to the payee.

\* \* \* \* \*

UNITED STATES PATENT AND TRADEMARK OFFICE
CERTIFICATE OF CORRECTION

| | |
|---|---|
| PATENT NO. | : 7,490,063 B2 |
| APPLICATION NO. | : 10/043247 |
| DATED | : February 10, 2009 |
| INVENTOR(S) | : Garrison et al. |

It is certified that error appears in the above-identified patent and that said Letters Patent is hereby corrected as shown below:

At column 10, line 44, after "number" delete ";".

Signed and Sealed this

Twenty-fourth Day of March, 2009

JOHN DOLL
*Acting Director of the United States Patent and Trademark Office*